US006374228B1

United States Patent
Litwin

(12) United States Patent
(10) Patent No.: US 6,374,228 B1
(45) Date of Patent: Apr. 16, 2002

(54) REBATE ADVERTISING SYSTEM IN USE WITH MOVING OBJECTS

(76) Inventor: Robert Litwin, 100 W. 106th St., Apt. # 5S, New York, NY (US) 10025

( * ) Notice: Subject to any disclaimer, the term of this patent is extended or adjusted under 35 U.S.C. 154(b) by 0 days.

(21) Appl. No.: 09/437,372

(22) Filed: Nov. 10, 1999

(51) Int. Cl.⁷ .............................................. G06F 17/60
(52) U.S. Cl. ....................................................... 705/14
(58) Field of Search ............................... 705/1, 10, 14, 705/16; 235/375, 380, 383

(56) References Cited

U.S. PATENT DOCUMENTS

| | | | | |
|---|---|---|---|---|
| 4,982,346 A | * | 1/1991 | Girouard et al. | 705/14 |
| 5,305,197 A | * | 4/1994 | Axler et al. | 705/10 |
| 5,612,527 A | * | 3/1997 | Ovadia | 235/383 |
| 5,695,346 A | * | 12/1997 | Sekiguchi et al. | 434/365 |
| 5,878,516 A | * | 3/1999 | Amirian | 40/591 |
| 6,129,276 A | * | 10/2000 | Jelen et al. | 235/383 |
| 6,134,532 A | * | 10/2000 | Lazarus | 705/14 |

FOREIGN PATENT DOCUMENTS

| | | | | |
|---|---|---|---|---|
| WO | WO 00/54192 | * | 9/2000 | 705/14 |
| WO | WO 00/60517 | * | 10/2000 | 705/14 |
| WO | WO 01/35251 | * | 5/2001 | 705/14 |

OTHER PUBLICATIONS

Cars in Chicago Soon Will Be Equipped With Two Horns—And That's No Bull; PRNewswire dated Apr. 7, 1993.*
Wagner's "Meats" The Challenge; Convenience Store News dated Mar. 27, 1995.*
Sonata Press Release dated Jul. 13, 2000 www.sonata.com.*

* cited by examiner

Primary Examiner—Stephen Gravini
(74) Attorney, Agent, or Firm—Sofer & Haroun, LLP

(57) ABSTRACT

An advertising system and method for providing rebates to individuals who affix advertisement displays, such as bumper stickers, on their vehicles and other objects. In accordance with one aspect of the present invention, an advertisement display is affixed to the rear portion of a vehicle. The advertisement display comprises an advertisement portion for displaying advertisements or other images and an identification portion for providing identification to at least one predetermined individual or entity. Such identification could include the owner of vehicle, for example, as well as the advertiser or any other needed information. A commercial entity, such as a gas station or any other participating retail or service establishment, is configured with a detector means for detecting and or communicating with the advertisement display and is in turn connected to a commercial entity computer via a connection means in order to connect to the database computer system of this invention. The database computer system comprises a database computer, which is connected to a database via a connection means. The database stores information about the vehicle and the advertisement display and instructs the participating commercial entity establishment if and how to provide the rebate.

10 Claims, 6 Drawing Sheets

REBATE ADVERTISING SYSTEM IN USE WITH MOVING OBJECTS

FIELD OF THE INVENTION

This invention relates to advertisement displays, and more particularly, to a rebate advertising system and method in use with moving objects.

BACKGROUND OF THE INVENTION

In today's modern world of fierce competition and bustling economics, companies and retailers are increasingly pressured to connect with every potential consumer so that profits and sales can be maximized. Fortunately, our current technological state of communications provides advanced methods for advertising as well as transmitting information about various products and services to the public. For example, mass-printed publications, radio, television, billboards, posters, etc. open avenues of contact that were once not imaginable.

Despite the success of the commercial world, there are several inherent limitations to the methods used in modern advertising. Mainly, the advertisement world of today functions within much of the same constraints as in the antiquated past. For example, companies are still mostly limited to the approach of purchasing a commercial 'spot' on a television show or in a magazine, etc. Indeed, advertisement has not evolved from this methodology, because there are few other ways to generate a system where consumer 'ratings' or 'subscription size' can be gauged to as to set a fair advertisement fee.

Yet, there is a myriad of potential 'consumer space' for advertisers to grab if only the appropriate technology to overcome the above-mentioned problem existed. Namely, if there were a new method for charging advertisers, perhaps advertisements could obtain a broader exposure to the consumer. Such exposure or 'consumer space' could include the actual consumer as well as the entire individual consumer market as opposed to the professional advertising means, as mentioned above.

Furthermore, the present method used to charge for advertisement does not function effectively with moving objects, such as cars. This is because there is no set number of viewers or other criteria to gauge the effectiveness and/or worth of the advertisement. For example, one car could remain parked in a garage for the majority of a given day, while another drives around a heavily populated area. Moreover, there is no way of verifying if the driver does indeed display the advertisement on his or her car.

Thus, what is needed is a method of advertising via a system that enables companies to utilize the myriad of other potential commercial space. Such a system would preferably create advertising techniques that go outside the constraints in existence today.

OBJECTS AND SUMMARY OF THE INVENTION

It is thus a general object of the present invention to provide a rebate advertisement system that enables companies to advertise with moving objects, among other things.

A more specific object of the present invention is to provide a rebate advertising system, wherein advertisers provide advertisement displays to be affixed on vehicles or other devices, and the vehicle operator or other user receives a rebate or discount when the advertisement display is detected in a participating retail or service establishment.

In accordance with one aspect of the present invention, an advertisement display is affixed to the rear portion of a vehicle. The advertisement display comprises an advertisement portion for displaying advertisements or other images and an identification portion for providing identification to one or more predetermined individuals or entities. Such identification could include the owner of vehicle, for example, as well as the advertiser or any other needed information.

A commercial entity, such as a gas station or any other participating retail or service establishment, is configured with a detector means for detecting and or communicating with the advertisement display and in turn connected to a commercial entity computer via a connection means in order to connect to the database computer system.

Database computer system comprises a database computer, which is connected to a database via a connection means. The database stores information about the vehicle and the advertisement display and instructs the participating commercial entity establishment if and how to provide the rebate.

The advertisement display, according to one embodiment of the invention, is a bumper sticker that is attachably or detachably affixed to the body of a vehicle. In this embodiment, the identification portion could be a bar code or other computer scannable code, so that a device such as the detector means of the commercial entity can electronically or otherwise detect one or more identification codes from the advertisement display. Illustratively, a vehicle can drive into a gas station, for example, wherein a scanner at the gas pump or other location identifies the presence of a particular bumper sticker advertisement. Then, in response to a particular identification code and subsequent communication with database computer system, a predetermined response, such as a cash discount toward the purchase of gas at the gas station is provided. Such a rebate could be provided automatically at the pump or via a printed coupon or other methodology that provides a similar corresponding benefit in response to the advertisement.

In this manner, for example, a vehicle could register for and obtain an advertisement display, for the display of advertisement on the vehicle's bumper, and be compensated via a commercial entity discount or other benefit, in exchange for affixing the bumper sticker on the vehicle.

The above description sets forth rather broadly the more important features of the present invention in order that the detailed description thereof that follows may be understood, and in order that the present contributions to the art may be better appreciated. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views.

DETAILED DESCRIPTION OF THE INVENTION

Figure 1:
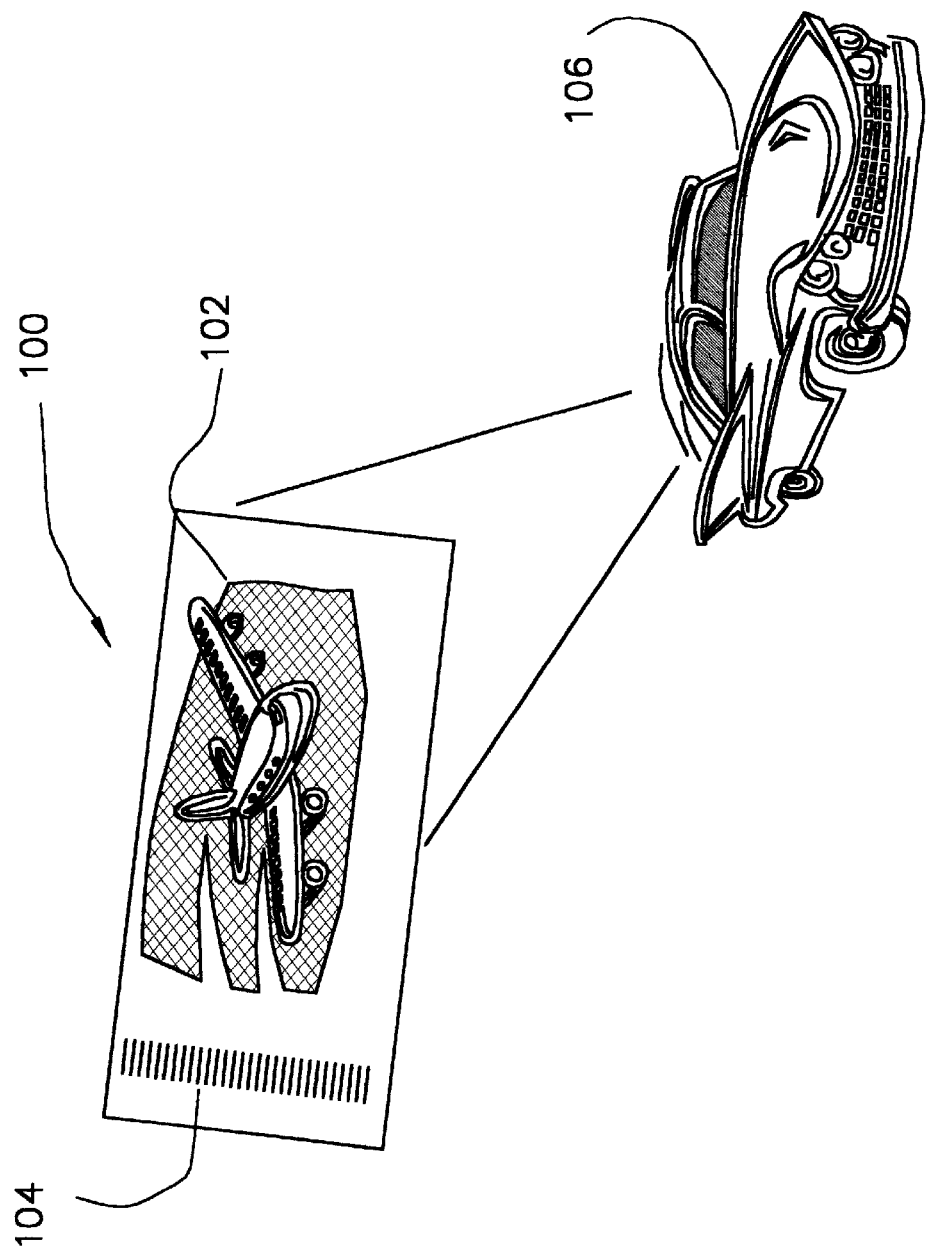
FIG. 1 shows a bumper sticker advertisement display according to one embodiment of the invention, affixed to the rear portion of a vehicle.

With initial reference to FIG. 1, an advertisement display 100 is shown affixed to the rear portion of a vehicle 106, according to one embodiment of the present invention. Advertisement display 100 comprises an advertisement portion 102 for displaying advertisements or other images and an identification portion 104 for providing identification to one or more predetermined individuals or entities. Such identification could include the owner of vehicle 106, for example, as well as the advertiser or any other needed information.

Figure 2:
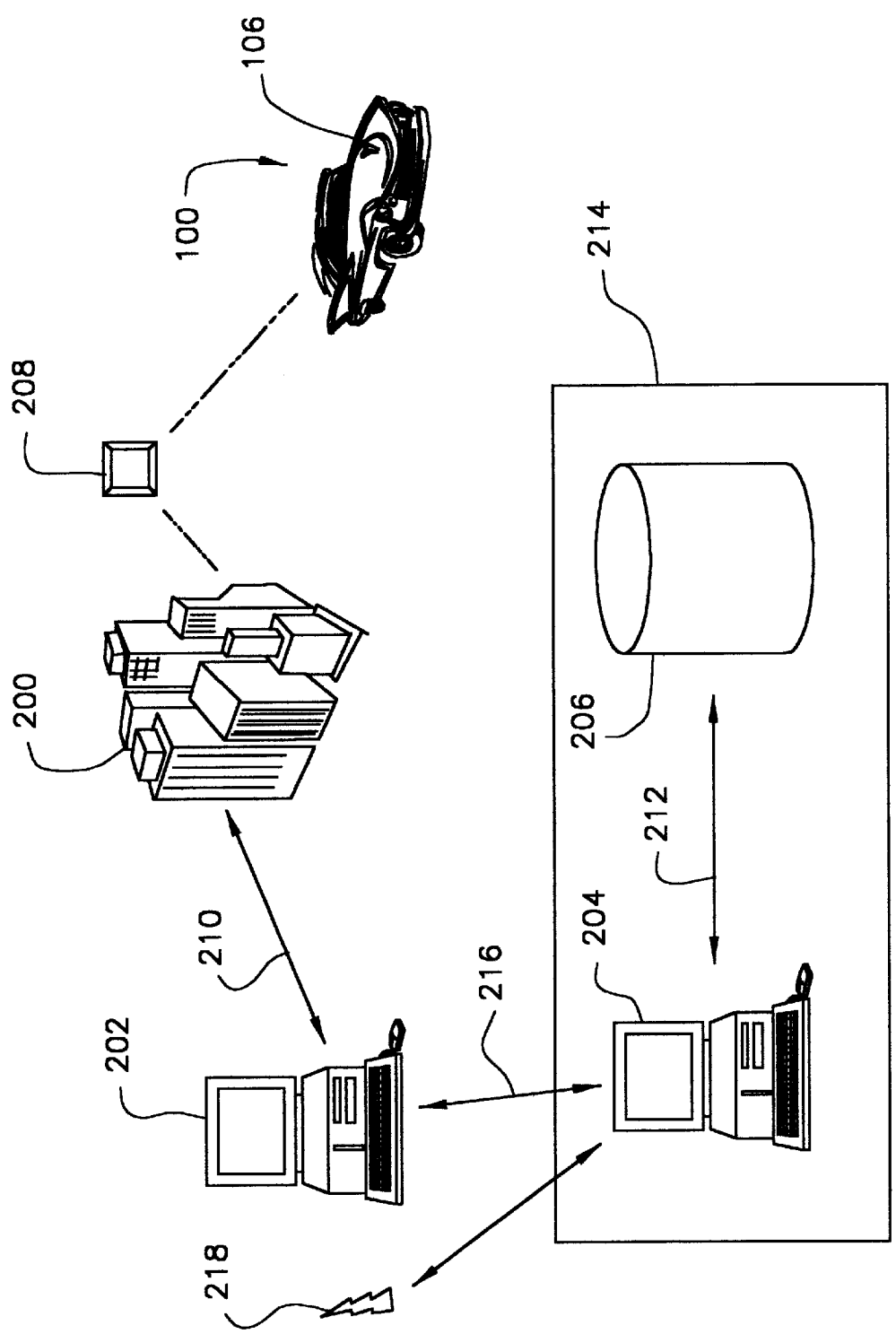
FIG. 2 shows the computer database system of one embodiment of this invention, wherein the advertisement display of FIG. 1 is detected by a participating commercial entity, which in turn communicates with the system.

With reference to FIG. 2, vehicle 106 is shown communicating with the database computer system 214 according to one embodiment of this invention. Database computer system 214 comprises a database computer 204 which is connected to a database 206 via a connection means 212.

FIG. 2 further illustrates a commercial entity 200, such as a gas station, which is configured with a detector means 208 for detecting and or communicating with advertisement display 100 and in turn connected to a commercial entity computer 202 via connection means 210 in order to connect to database computer system 214 via connection means 216. The method and operation of computer database system 214 as well as the communication process via commercial entity 200 will be described in more detail below.

Advertisement display 100, according to one embodiment of the invention, is a bumper sticker that is attachably or detachably affixed to a portion of vehicle 106. Naturally, it should be noted that advertisement display 100 is not limited to the configuration as illustrated in FIG. 1 and as recited hereinabove. For example, advertisement display 100 could be configured as a windshield cover or a wheel hubcap, or any other visible portion of a vehicle. In fact, as will be discussed in more detail below, the method of this invention can be configured for use in any environment, not solely that of a vehicle.

In the above-mentioned embodiment, identification portion 104 could be a bar code or other computer scannable code, so that a device such as detector means 208 can electronically or otherwise detect one or more identification codes from advertisement display 100. Illustratively, a vehicle can drive into a gas station, or any other participating retail or service establishment, for example, wherein a scanner at the gas pump or other location identifies the presence of a bumper sticker advertisement. Then, in response to a particular identification code and subsequent communication with database computer system 214, a predetermined response, such as a cash discount toward the purchase of gas at the gas station is provided. Such a rebate could be provided automatically at the pump or via a printed coupon or other methodology that provides a similar corresponding benefit in response to the advertisement.

In this manner, for example, a vehicle could register for and obtain advertisement display 100, for the display of an advertisement on the vehicle's bumper, and be compensated via a commercial entity discount or other benefit, in exchange for affixing the bumper sticker on the vehicle. The complete process and use of the system of this invention will be described in more detail below with reference to FIG. 5.

According to another embodiment, the identification portion of the advertisement display could be a transmitter, wherein the appropriate code or signal is transmitted to the corresponding commercial entity, as opposed to the commercial entity having to locate the advertisement display. This reduces the possibility of error by not requiring the detector means of the commercial entity to search and find a bar code or similar identification. Such a transmitter device could be attached to the advertisement portion, as above, or be a separate and distinct unit operating in conjunction with the advertisement portion.

Moreover, various methods can be used to ensure that such a transmitter only operates or transmits when a corresponding advertisement is present. For example, an activation system can be utilized, wherein the transmitter remains deactivated until a signal is sent from the advertisement display. A simple LED light or bar code may be sufficient for this task. Illustratively, the advertisement displays can be configured to emit a particular signal via an attached LED light, for example. Unless an advertisement display is present, the transmitter will not detect the proper coded LED light and will remain deactivated.

Similarly, a two tier system can be utilized to preserve the resources of the commercial entity. At the first tier, the transmitter or other device notifies the commercial entity when an advertisement display is present so that the detector means of the commercial entity can remain dormant for other non-participating vehicles. Thereafter, at the second tier the commercial entity is provided with the actual identification transmission from the transmitter.

Notably, there are many security and technological concerns with this invention. These include means for detecting fraud, such as individuals attempting to obtain discounts without affixing the advertisement display to their car, as stated above. Furthermore, there are other technological concerns, wherein the database computer system needs to intelligently determine the length of time an advertisement has been displayed and at what locations, etc. These issues will now be discussed along with the discussion of the database computer system structure and corresponding FIGS. 3 and 4.

Figure 3:
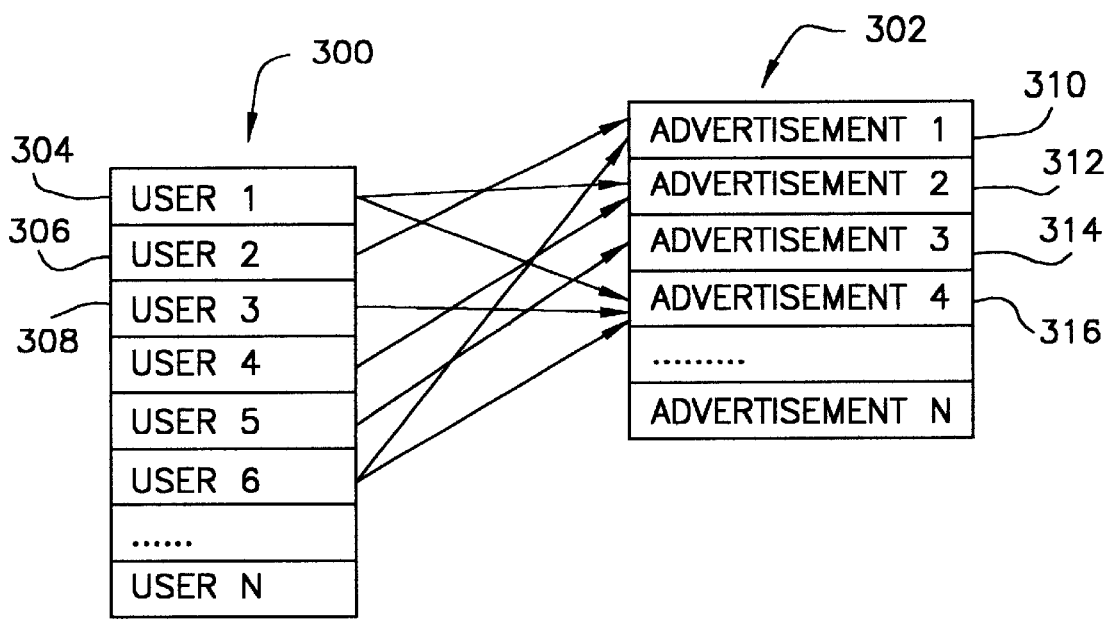
FIG. 3 shows a user list and an advertisement list for storing data on the database computer system of FIG. 2, according to one embodiment of this invention.
Figure 4:
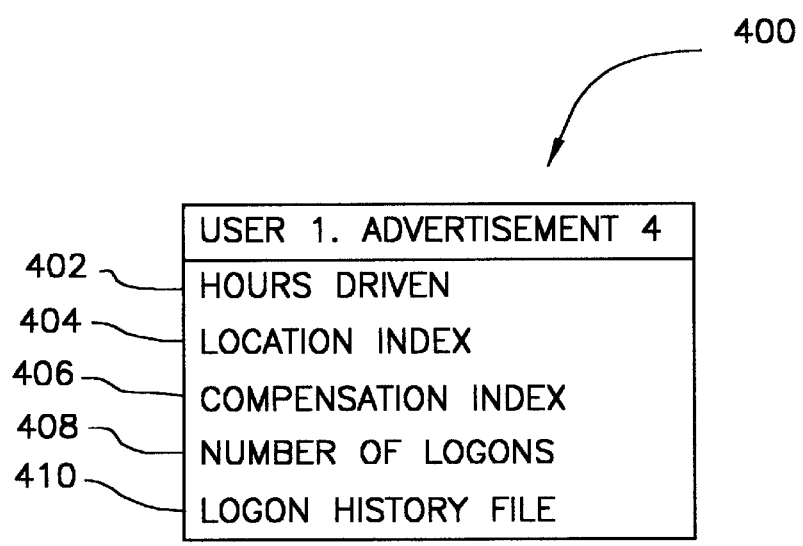
FIG. 4 shows an account record for one advertisement display of a user, according to one embodiment of this invention.

With reference to FIGS. 3 and 4, the logical structure of a portion of database 206 is shown, according to one embodiment of the invention. Database 206 comprises a user list 300, an advertisement list 302 and one or more account records 400.

User list 300 is configured to store a plurality of user entries, such as user entries 304–308, wherein each user entry 'points to' one or more advertisement entries from advertisement list 302, such as advertisement entries 310–316.

Briefly, database computer system 214 is configured to keep track of and manage all advertisements distributed by the system of this invention. This is accomplished by maintaining an entry in database 206 (FIG. 2) for each of the many individuals (users) who are displaying advertisements on their vehicles, for example. Furthermore, each user entry has one or more account records 400, as described below, to store information for each corresponding advertisement(s) being displayed.

Thus, a given user or individual can register to use one or more advertisement displays. Illustratively, user entry 304, for example, which may correspond to an individual car owner, is registered for advertisements 312 and 316. Each of these two advertisement registrations corresponds, for example, to a particular type of bumper sticker or other advertisement for display on the vehicle of user 1. Naturally, more than one user may display the same advertisement and hence several advertisements are 'pointed to' by more than one user.

For every advertisement display assigned to a user a corresponding account record, such as account record 400, is provided to record and keep track of various data so that the user can be properly compensated, among other things.

As shown in FIG. 4, the account record for one of the advertisement displays of user 1 is displayed. The account record has storage means to record information corresponding to the use of advertisement 4 by user 1. These include, according to one embodiment of the invention, hours driven 402, location index 404, compensation index 406, number of logon 408, and logon history file 410.

Hours driven 402, keeps track of the time advertisement display 100 has been on the road and visible to the public. Location index 404 records an index number to factor the various locations driven to. For example, cars that often drive through more heavily populated areas may generate a higher location index and a larger rebate. Compensation index stores a number based on the fee paid for the corresponding advertisement. For example, an advertisement affixed to a "Lexus"™ vehicle may generate a higher compensation rate than a similar advertisement on a "Honda"™, because advertisers may be willing to pay extra for the more impressive impact offered by a luxury car. Similarly, a "Pepsi"™ advertisement may generate a higher compensation rate than a local advertisement, because a larger percentage of the viewing public are potential "Pepsi"™ consumers. Naturally, the compensation rate may be adjusted to conform with generally accepted business practices. The compensation index is combined with the location index to produce the effective rebate, such as the amount and frequency of discounts at a participating establishment.

Number of logon field 408 records the number and frequency of connections established between advertisement display 100 and database computer system 214. Logon history file 410 tracks the activity of a particular account, such as how many and the amount of rebates previously redeemed.

According to one embodiment, the number of logons field may be used to estimate the length of time a car has been on the road to ensure against fraud and determine the proper rebate to apply, as mentioned above. For example, the database computer system may have tracking points (not shown) at various locations throughout a particular city. These tracking points will typically be located at participating commercial establishments. Each time a vehicle with an advertisement display passes such a tracking point a detection device notifies the database computer system. Thus, even at locations where the individual is not able to redeem his or her rebate points, a device may be used to simply track the presence of the advertisement display. Based on the number of times a connection with the database computer system has been established, the database may decide to increase or decrease the rebate provided to the user, etc. Of course, the database computer system may be configured to ignore multiple passes through a detection device within a short period of time, so that individuals will not be able to accumulate points illegitimately by repeatedly driving by a tracking point.

According to yet another embodiment, another system for detecting fraudulent use is utilized. In this embodiment, rather than estimating the length of time a car has been on the road a standard fixed rebate is provided to all vehicles having an advertisement display. When the advertisement display is detected by a commercial entity, such as a gas station, the detector means further scans for one of several security devices to ensure that the advertisement display is indeed affixed to a corresponding vehicle or other valid object. For example, as mentioned above, a vehicle may be equipped with a signaling device that detects or verifies the presence of a properly affixed advertisement display.

Alternatively, the detecting means could check if a license plate is visibly near the advertisement display, whereas, according to one embodiment, individuals would be required to affix all advertisement displays in that location. This detection could be done electronically via intelligent computer vision software. Another method to check for a license plate is to have an employee or other person randomly or sequentially view video images of vehicles to verify that the advertisement display or a license plate is present.

It is understood that the database of this invention can store relevant data in addition to that mentioned above. For example, an advertiser database can be established (not shown) to keep track of the success and/or popularity of an advertisement display. Thus, the advertiser has means to see the number of individuals registered to a particular advertisement display. Also, the total number of rebate points accumulated by all registered individuals as well as the geographic areas covered by the advertisement can be stored as well.

Upon completion of an advertisement campaign, the advertiser database may be configured to notify all individuals registered to the corresponding advertisement display that they should remove the advertisement. The notification may be accomplished via the Internet, such as by e-mail or on a company Website as well as by traditional mail. Also, the commercial entities may be configured to provide such notification when an outdated advertisement display is detected.

According to one embodiment, an Internet site is configured so that both the advertisers and the individual users can access portions of the above-mentioned database over the Internet, such as via Internet connection means 218 (FIG. 2). The Internet could provide means for individuals to view the number of accumulated rebate points and for advertisers to track the effectiveness of their advertisement display, among other things. For example, advertisers can determine which commercial entities are most popular, by checking how many advertisement displays passed through there. In one embodiment, individuals could use the Internet when initially registering for an advertisement display, by choosing from a variety of advertisements according to their preference, etc.

Also, a selection of coupons or other on-line rebates can be offered so that individuals can redeem their rebate points on the Internet. For example, electronic certificates toward the purchase of books at "Amazon.com"™ or a similar site may be provided. Alternatively, an actual coupon can be requested via traditional mail.

Figure 5:
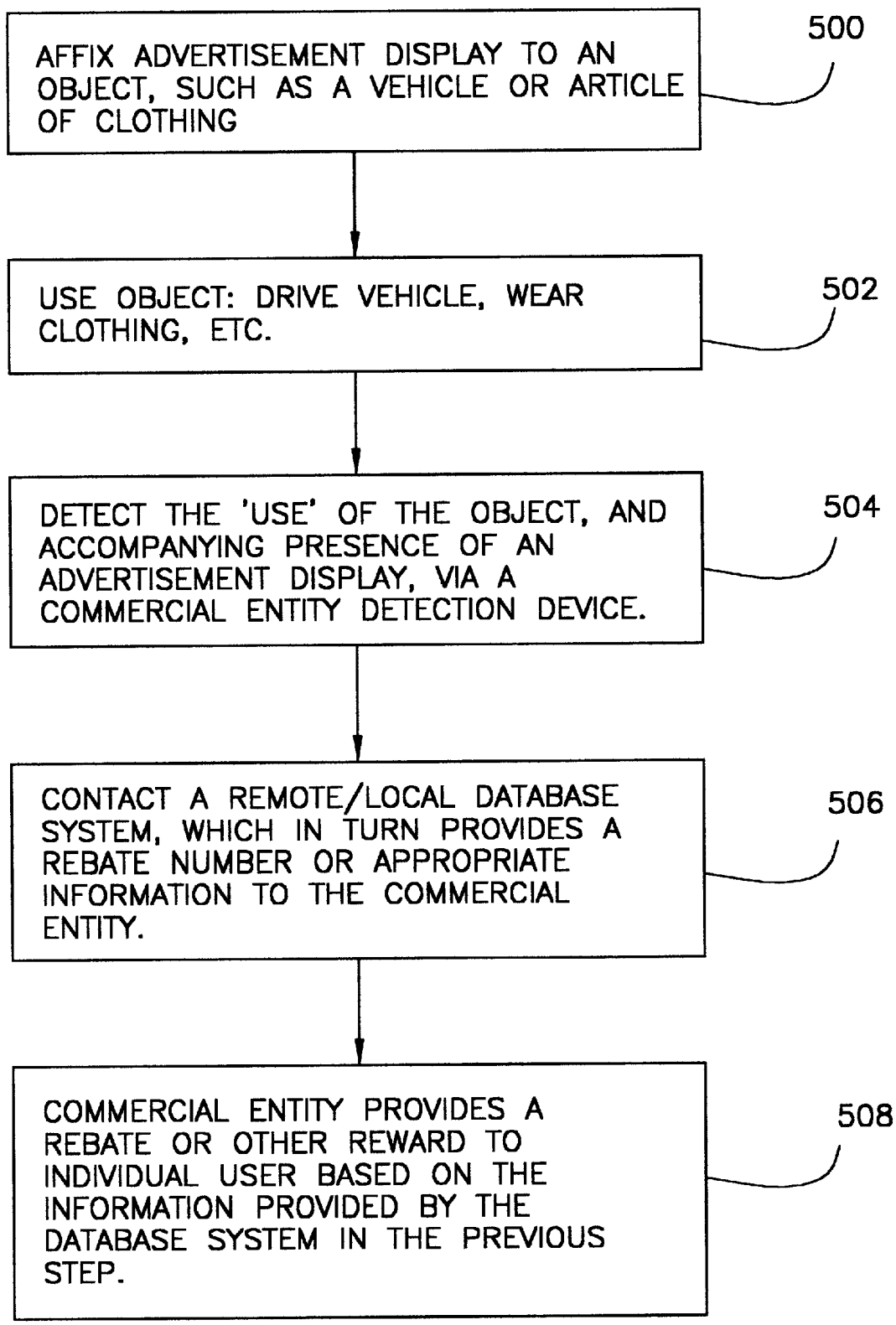
FIG. 5 is a flowchart of the system of this invention for providing a rebate to individuals displaying an advertising display.

The method of using advertisement display 100 and receiving a corresponding rebate, according to one embodiment of this invention, will now be explained with reference to FIGS. 2 and 5, which respectively illustrate a graphic illustration of the various components of this invention and a flow diagram of the relevant steps used by the rebate system of this invention.

Initially, at step 500 advertisement display 100 is affixed to an object. As described above, advertisement display may, in one embodiment, be a bumper sticker affixed to the rear portion of a vehicle. In yet other embodiments, advertisement display may be a label affixed to an article of clothing, such as a T-shirt or baseball cap. Alternatively, advertisement display may be affixed to sports equipment, kites, bicycles, etc.

At step 502, the above-mentioned item to which advertisement display 100 is affixed is driven or brought by an individual to commercial entity 200, as illustrated in FIG. 2. For example, a vehicle may be driven to a gas station or fast-food restaurant or any other participating retail or service establishment.

Other objects that have sufficient space for advertising may also be employed. For example, golf equipment could be brought to a golf course, a baseball cap to a sports game, etc.

At step 504, commercial entity 200 detects one or more identification numbers 104 from advertisement display 100 of vehicle 106 and communicates with commercial entity computer 202 via connection 210 to retrieve corresponding rebate information from database computer system 21 via connection 216. One method of simplifying the detecting process for an individual to carry an ID card and swipe it at a gas pump or other location of a commercial entity. As described above, the commercial entity may also have detection means to automatically detect the presence of an advertisement display, for verification purposes.

Indeed, as mentioned above, security measures may be taken here to ensure that a valid advertisement display is in fact present and that it is affixed in a proper location. For example, a camera can capture an image of the rear of a vehicle so that a computer or individual can verify that there is an advertisement display affixed to an actual vehicle. One way to do so would be to visually or electronically check for a license plate. Naturally, the security measures mentioned above would be less rigid for a baseball cap advertisement display and more rigid for an automobile display. Likewise, a larger discount or rebate could be offered for the vehicle advertisement as it covers more breadth and is less prone to fraud.

At step 506, database computer system 214 utilizes database computer 204 and database 206 to retrieve database elements 300, 302 and 400 in order to provide the appropriate rebate number or other response to commercial entity computer 202. The database in turn would record the commercial entity transaction and modify the individuals total rebate number if necessary.

At step 508, commercial entity 200 presents a discount or coupon to driver of vehicle 106 based on the response provided at step 506. The discount here, may be provided via a printing station at the commercial entity or it could be provided via mail or the Internet. In addition, according to one embodiment, one response may be to contact the police station if the corresponding vehicle has been reported stolen.

It is understood that the invention as described herein is but one embodiment and is not limited as such. For example, in another embodiment, advertisement display 100 may be configured with cellular communications technology. In this manner, database computer system 214 can continuously track the whereabouts of advertisement display 100 and provide a more accurate and secure rebate system to the individual.

In yet another embodiment, advertisement display is configured to operate with the speedometer of a vehicle so that the number of miles traveled with the advertisement can be accurately recorded. Thus, an advertisement display situated on a vehicle can have a measurement or active use device or other sensor to determine the length of time a vehicle is in motion. Alternative methods of tracking advertisement display use, whether displayed on a vehicle or other object, include heat detection, motion detection, light detection, heartbeat detection, etc.

Figure 6:
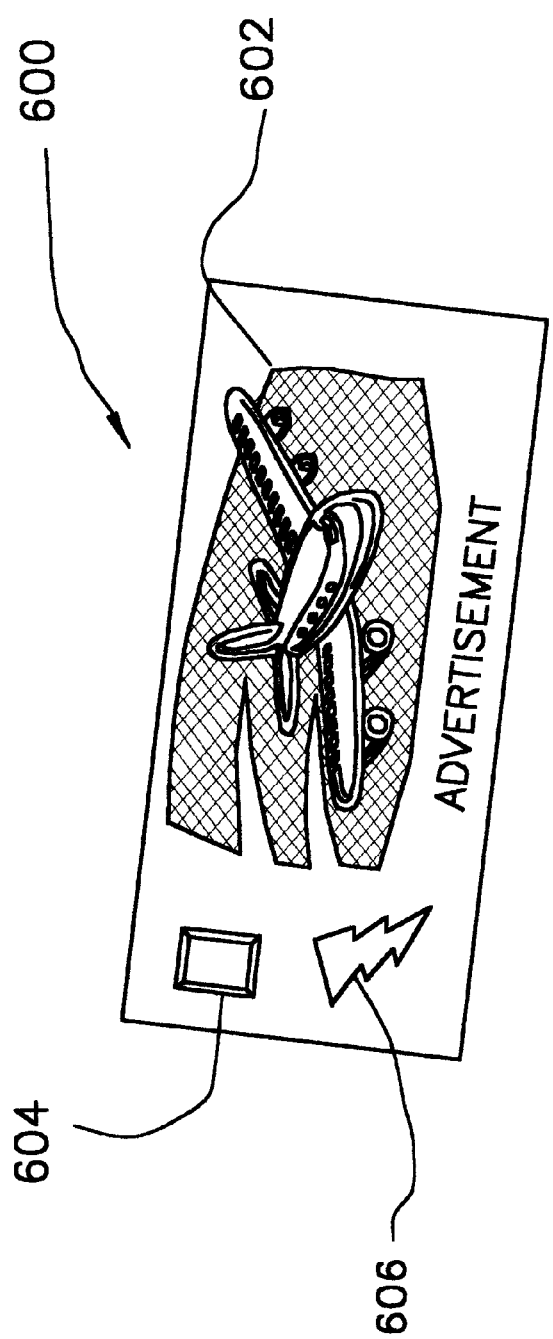
FIG. 6 shows an advertisement display, according to one embodiment of the invention, having an active use device and a recording chip.

With reference to FIG. 6, an advertisement display 600 is shown according to one embodiment of the invention, having an advertisement 602, a recording chip 604 and an active use device 606. As described above, the active use device 606 may be connected to the speedometer of a vehicle or a motion detection device, wherein the device determines the amount of time the advertisement display is actively displayed. For example, the active use device can be connected to the speedometer of a vehicle so that is may calculate the amount of time the vehicle is in motion. Thereafter, the time is recorded in the recording chip 204 and subsequently transmitted to the database system of this invention to determine the appropriate rebate to give to the vehicle owner.

The active use device 606 can also be configured to operate with a motion detector, heat detector, etc. to similarly determine the amount of time the advertisement display is being actively displayed. For example, an article of clothing having an advertisement display can comprise an active use device, or similar component, that determines the length of time the article of clothing is being worn. This may operate similar to some automatic watch systems, where a timer is incremented via a winding system as the individual wearer is in motion.

In addition, more. sophisticated embodiments may include heat or heartbeat detection, among other techniques, for determining whether an individual is wearing an article of clothing or advertisement display. Such detection devices can also be used to time the length of use by sensing body heat or a continuous heartbeat, etc.

Figure 7:
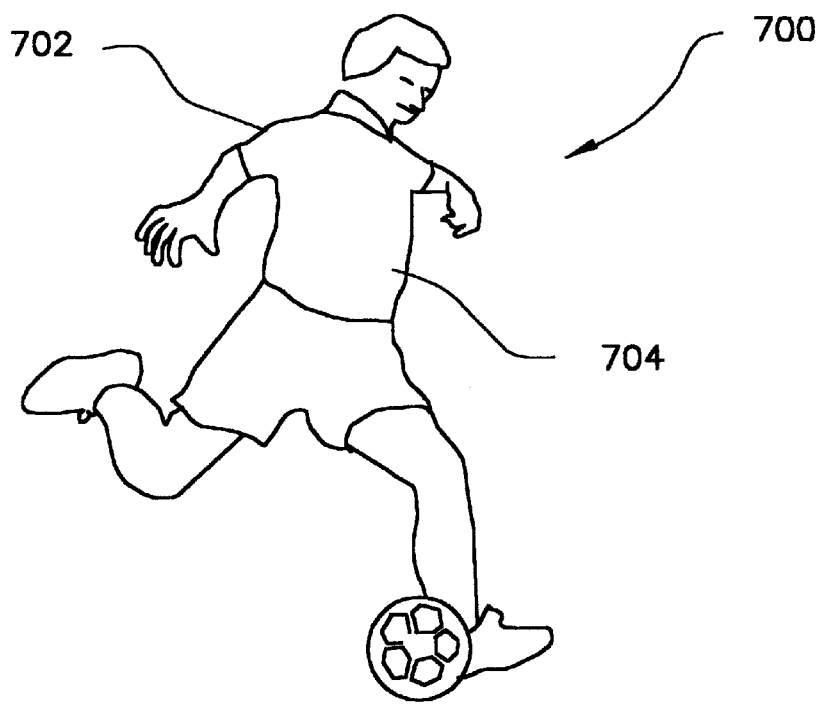
FIG. 7 shows an individual wearing a shirt, wherein the detection device according to one embodiment of the invention is able to track the amount of time that the shirt is worn.

With reference to FIG. 7, an individual 700 is shown, wearing a shirt 702 having a body heat and heartbeat detection device 704. Similar to the active use device above, this device 704 detects a heartbeat or body heat and subsequently records the time that an individual is wearing the shirt, based on such data.

Figure 8:
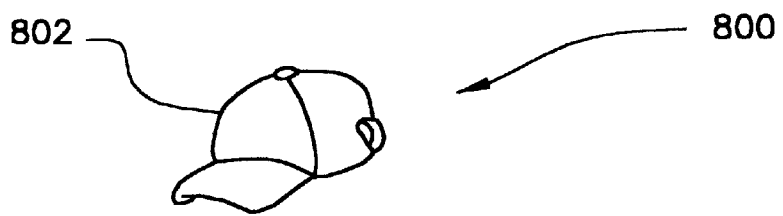
FIG. 8 shows a cap configured with a detection device to operate with the rebate system of one embodiment of this invention.

FIG. 8 shows a cap 800 with detection device 802 that also operates via a chip or device to detect the amount of time an individual is wearing the cap. For example, device 802 can detect heat or motion, etc., to sense if the hat is on a person's head. Notably, the embodiment of FIG. 8 does not comprise an advertisement. As will be described below the system of this invention may be configured to operate without any advertisement.

In one embodiment, the information obtained via the above-mentioned detection devices can be transmitted to a remote server, such as the database computer system of this invention, wherein the provided rebates, for example, are directly impacted by the length of time calculated by the detection device. Optionally, in order to counterbalance the potential errors generated by a less sophisticated detection system, the database computer system can round off the provided detection information to the nearest whole unit. For example, an advertisement display that detects four hours of motion can be interpreted by the database computer system as one unit, corresponding to a fall day of advertisement display use. Similarly, an advertisement display that detects twelve hours would also be interpreted as the same one unit, and so on. This system resolves any potential difficulty with a detection system that may have a large margin of error.

In yet another embodiment, as mentioned above with reference to FIG. 8, advertisement display can be configured to operate without an advertisement. Indeed, a clothing manufacturer may configure the advertisement display of one embodiment of this invention to operate with shirts, pants, caps, etc. In other words, a participating commercial establishment could provide rebates or discounts to individuals wearing a particular item of clothing. Thus, a shirt could be provided with a transmitter, in the shirt lining, for example, and upon entering a commercial establishment the transmitter is detected. In this embodiment, no actual advertisement is displayed. Rather, the advertiser is paying individuals to wear their clothing, or other item, at a particular location. One application of this embodiment, for example, is for a company to provide sports event discounts to individuals who attend a sports event wearing their cap.

Furthermore, this invention is not limited to the types of commercial entities and advertisements described above. For example, other possible commercial entities are restaurants, parking lots, malls, banks, amusement parks, or any other business. Also, the advertisements can be in any format and on an object. As mentioned above, advertisements can be placed on caps, t-shirts, shoes, bicycles, etc. In addition, the advertisement itself, may also be in various formats, such as a text phrase, a picture, a 3D image, a video image, a sound recording, etc.

Thus, while there have been shown and described and pointed out fundamental novel features of the invention as applied to alternative embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto. It is to be understood that the drawings are not necessarily drawn to scale, but that they are merely conceptual in nature.

What is claimed is:

1. A rebate advertising system comprising:

at least one advertisement display, each having an advertisement portion and an identification portion, wherein said advertisement display is associated with at least one individual;

a database computer system configured to store said identification portion and corresponding data of said advertisement display and said individual;

at least one commercial entity, each having at least one detector means, wherein said detector means is configured to retrieve data from said identification portion of said advertisement display, said commercial entity further configured to communicate with said database computer system; and connection means for enabling said communication between said commercial entity and said database computer system so that at least one rebate can be provided to said individual based on said corresponding data of said database computer system.

2. The rebate advertising system of claim 1, wherein at least one of said advertisement display is a bumper sticker.

3. The rebate advertising system of claim 1, wherein said identification portion is at least one of a bar code, a transmitter, an ID card, and an LED light.

4. The rebate advertising system of claim 1, wherein said commercial entity comprises gas stations, restaurants, parking lots, department stores, recreational and sports locations, business stores, and shopping malls.

5. The rebate advertising system of claim 1, further comprising an object, wherein each of said advertisement display is affixed to said object.

6. The rebate advertisement system of claim 5, wherein said object comprises at least one of a vehicle, a shirt, shoes, a cap, sports equipment, bicycles and moveable objects.

7. The rebate advertisement system of claim 1, wherein said database computer system is accessible to said individual via the Internet.

8. The rebate advertisement system of claim 1, wherein said connection means comprises the Internet.

9. The rebate advertisement system of claim 1, wherein said detector means comprises at least one of a camera, an ID card scanner, a bar code scanner, and a digital scanner.

10. The rebate advertising system of claim 1, wherein said corresponding data of said database computer system comprises an hours driven field, a location index field, a compensation index field, a number of logons field, and a logon history file field.

* * * * *